United States Patent
Takeno et al.

(10) Patent No.: US 9,651,110 B2
(45) Date of Patent: May 16, 2017

(54) CYLINDER APPARATUS

(71) Applicant: HITACHI AUTOMOTIVE SYSTEMS, LTD., Ibaraki (JP)

(72) Inventors: Ryosuke Takeno, Yokohama (JP); Teruaki Yamanaka, Ayase (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/626,306

(22) Filed: Feb. 19, 2015

(65) Prior Publication Data

US 2015/0247549 A1 Sep. 3, 2015

(30) Foreign Application Priority Data

Feb. 28, 2014 (JP) ................................. 2014-039242

(51) Int. Cl.
- F16F 9/48 (2006.01)
- F16F 9/58 (2006.01)
- F16F 9/49 (2006.01)

(52) U.S. Cl.
CPC ................ *F16F 9/585* (2013.01); *F16F 9/49* (2013.01)

(58) Field of Classification Search
CPC .... F16F 9/49; F16F 9/516; F16F 9/483; F16F 9/48; F16F 9/34; F16F 9/3405; F16F 9/36; F16F 9/585; F16F 9/368
See application file for complete search history.

(56) References Cited

U.S. PATENT DOCUMENTS

| | | | | | |
|---|---|---|---|---|---|
| 4,230,309 | A | * | 10/1980 | Schnitzius | F16F 9/0209 16/66 |
| 4,345,748 | A | * | 8/1982 | Wossner | B60G 15/061 188/322.17 |
| 4,558,767 | A | * | 12/1985 | Taylor | F16F 9/516 138/31 |
| 4,852,703 | A | * | 8/1989 | Nishimoto | F16F 9/49 188/284 |
| 4,901,828 | A | * | 2/1990 | Schmidt | F16F 9/48 16/51 |

(Continued)

FOREIGN PATENT DOCUMENTS

| | | |
|---|---|---|
| JP | 50-23593 | 3/1975 |
| JP | 4-25551 | 6/1992 |

*Primary Examiner* — Bradley King
*Assistant Examiner* — Stephen Bowes
(74) *Attorney, Agent, or Firm* — Wenderoth, Lind & Ponack, L.L.P.

(57) ABSTRACT

A stopper mechanism includes a second cylinder disposed at an end in a first cylinder, a second piston disposed so as to be able to move according to a movement of a piston rod to be fitted into the second cylinder, and an annular piston ring having ends in a circumferential direction by being partially cut off. A circumferential groove is formed on an outer circumferential of the second piston. The circumferential groove includes a bottom surface, a one-side end surface, and an opposite-side end surface. The piston ring is axially movably disposed in the circumferential groove. The piston ring includes axial abutment portions, and radial abutment portions at the both ends of the piston ring. When the piston ring abuts against the one-side end surface of the circumferential groove, a first passage is forced between the one-side end surface and an end surface of the piston ring.

14 Claims, 4 Drawing Sheets

(56) References Cited

U.S. PATENT DOCUMENTS

| | | | | |
|---|---|---|---|---|
| 5,409,087 A | * | 4/1995 | Angermann | F16F 9/516 188/284 |
| 5,960,915 A | * | 10/1999 | Nezu | F16F 9/325 188/266.6 |
| 2015/0090548 A1 | * | 4/2015 | Yamanaka | F16F 9/3221 188/297 |

* cited by examiner

CYLINDER APPARATUS

TECHNICAL FIELD

The present invention relates to a cylinder apparatus mounted on a vehicle such as a four-wheeled automobile, and preferably used to absorb a vibration of the vehicle.

BACKGROUND OF THE INVENTION

Generally, vehicles such as automobiles are provided with a hydraulic shock absorber as a cylinder apparatus mounted between each wheel (an axle side) and a vehicle body, thereby being configured to absorb a vibration of the vehicle (for example, refer to Unexamined Japanese Utility Model Application Public Disclosure No. S50-23593 and Examined Japanese Utility Model Application Publication No. H4-25551). The cylinder apparatus according to this kind of related technique includes a hydraulic stopper mechanism configured to prevent a piston rod from extending completely by exercising a cushion function when the piston rod extends maximally.

Various kinds of mechanisms have been developed for the hydraulic stopper mechanism, but there is still a demand for simplifying the structure and also reducing an impact when the piston rod extends maximally at the same time.

SUMMARY OF THE INVENTION

The present invention has been contrived in consideration of the above-described drawback of the conventional technique, and an object of the present invention is to provide a cylinder apparatus capable of reducing the impact when the piston rod extends maximally with a small number of parts.

To achieve the above-described object, according to an aspect of the present invention, a cylinder apparatus includes a first cylinder sealingly containing hydraulic fluid, a first piston slidably fitted in the first piston and dividing an inside of the first cylinder, a piston rod coupled to the first piston, a rod guide disposed on one end side of the first cylinder rod configured to slidably guide the piston rod with the piston rod inserted through the rod guide, and a stopper mechanism configured to function when the piston rod extends or compresses to reach an end in the first cylinder. The stopper mechanism includes a second cylinder disposed at the end in the first cylinder, and a second piston disposed so as to be able to move according to a movement of the piston rod to be fitted into the second cylinder. The second piston includes a circumferential groove formed on an outer circumference of the second piston. The circumferential groove including a bottom surface, a one-side end surface, and an opposite-side end surface. An annular piston ring is axially movably disposed in the circumferential groove. The piston ring has ends in a circumferential direction by being partially cut off. The piston ring includes axial abutment portions axially abuttable against each other, and radial abutment portions radially abuttable against each other, at the both ends of the piston ring. A first passage is formed between an end surface of the piston ring and the one-side end surface when the piston ring abuts against the one-side end surface that is located at an end of the circumferential groove closer to the end in the first cylinder.

DETAILED DESCRIPTION OF THE PREFERRED EMBODIMENTS

In the following description, cylinder apparatuses according to embodiments of the present invention will be described in detail with reference to the accompanying drawings based on an example in which the cylinder apparatus is applied to a hydraulic shock absorber.

Figure 1:
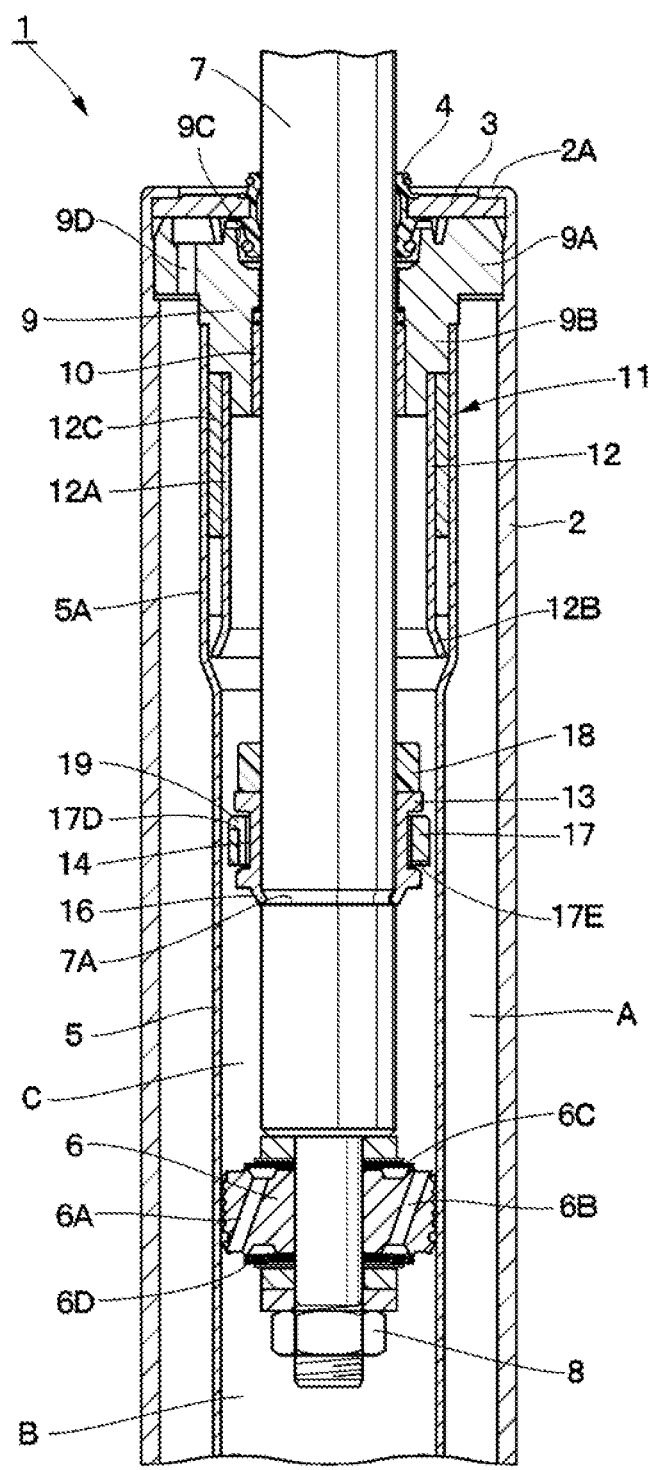
FIG. 1 is a vertical cross-sectional view of a hydraulic shock absorber as a cylinder apparatus according to a first embodiment of the present invention.

First, FIGS. 1 to 5 illustrate a first embodiment of the present invention. Referring to FIG. 1, reference numeral 1 denotes a hydraulic shock absorber as a representative example of the cylinder apparatus. The hydraulic shock absorber 1 includes a cylindrical outer cylinder 2 serving as an outer shell of the hydraulic shock absorber 1, an inner cylinder 5, a first piston 6, a piston rod 7, a rod guide 9, and a stopper mechanism 11.

The outer cylinder 2 of the hydraulic shock absorber 1 has a closed end that is closed by a bottom cap (not illustrated) on one end side thereof (a lower end illustrated in FIG. 1), and an open end on an upper end side as an opposite end side thereof. A swaged or staked portion 2A, which is formed by bending the outer cylinder 2 radially inwardly, is provided on the open end (upper end) side of the outer cylinder 2. The swaged portion 2A holds a cover member 3, which closes the open end side of the cuter cylinder 2, so as to prevent the cover member 3 from being detached off.

The cover member 3 made of an annular disk is fixed on an outer circumferential side thereof by one swaged portion 2A of the outer cylinder 2 while being in abutment with the rod guide 9 for closing the opening end (upper end) side of the outer cylinder 2, which will be described below. A rod seal 4 made of an elastic material is attached on an inner circumferential side of the cover member 3. The rod seal 4 seals between the piston rod 7 that will be described below, and the cover member 3.

The inner cylinder 5 as a first cylinder is disposed in the outer cylinder 2 so as to be positioned coaxially with the outer cylinder 2. One end (lower end) side of the inner cylinder 5 is fitted to the bottom cap side via a bottom valve (not illustrated), and is fixed there. The inner cylinder 5 includes a cylindrical enlarged-diameter portion 5A, which is formed so as to have a diameter increased radially outwardly, on an end that is an opposite end (upper end) side of the inner cylinder 5. The rod guide 9, which will be described below, is fitted and mounted on an inner circumference of an upper end side of the enlarged-diameter portion 5A. Oil as hydraulic fluid, is sealingly contained in the inner cylinder 5. Not only the oil but also, for example, water mixed with an additive can be used as the hydraulic fluid.

An annular reservoir chamber A is defined between the inner cylinder 5 and the outer cylinder 2. Gas is sealingly contained in the reservoir chamber A together with the oil. This gas may be air having an atmospheric pressure, and may be any gaseous body such as compressed nitrogen gas. During compression (a compression stroke) of the piston rod 7, the gas in the reservoir chamber A is compressed so as to compensate for a volume corresponding to an entry of the piston rod 7.

The first piston 6 is slidably fitted in the inner cylinder 5. The first piston 6 divides the inside of the inner cylinder 5 (the first cylinder) into two chambers, a bottom-side oil chamber B and a rod-side oil chamber C. Further, the first piston 6 includes oil passages 6A and 6B capable of establishing communication between the bottom-side oil chamber 8 and the rod-side oil chamber C. Further, a compression-side disk valve 6C is disposed on an upper end surface of the first piston 6. The compression-side disk valve 6C generates a predetermined damping force by providing a resistance force to the oil flowing through the oil passage 6A when the first piston 6 is slidably downwardly displaced due to compression of the piston rod 7. On the other hand, an extension-side disk valve 6D is disposed on a lower end surface of the first piston 6. The extension-side disk valve 6D generates a predetermined damping force by providing a resistance force to the oil flowing through the oil passage 6B when the first piston 6 is slidably upwardly displaced due to extension of the piston rod 7.

One end (lower end) side of the piston rod 7 is coupled to the first piston 6. More specifically, the lower end side of the piston rod 7 is inserted in the inner cylinder 5, and is fixedly attached to an inner circumferential side of the first piston 6 by a nut 8 and the like. Further, an upper end side of the piston rod 7 protrudes to the outside via the rod guide 9, the cover member 3, and the like in an extendable and compressible manner. An annular groove 7A is formed on the piston rod 7 at a position spaced apart by a predetermined distance from a position where the first piston 6 is attached. This annular groove 7A is defined by a circumferential groove extending along a whole circumference of the piston rod 7 on an outer circumferential side of the piston rod 7. A fitted portion 16 of a second piston 13, which will be described below, is fitted in the annular groove 7A, by which the second piston 13 is fixed to the piston rod 7.

The rod guide 9 is formed into a stepped cylindrical shape, and is fitted to the upper end side of the outer cylinder 2 and is also fixed to the upper end side of the enlarged-diameter portion 5A that is the opposite end side of the inner cylinder 5. As a result, the rod guide 9 functions to position an upper portion of the inner cylinder 5 at a center of the outer cylinder 2. Further, an inner circumferential side of the rod guide 9 slidably guides the piston rod 7 along an axial direction of the hydraulic shock absorber 1. Further, the rod guide 9 serves as a support structure that supports the cover member 3 from inside when the cover member 3 is fixed to the rod guide 9 from outside by swaging the swaged portion 2A of the outer cylinder 2.

The rod guide 9 is formed into a predetermined shape by, for example, performing molding processing, cutting processing, or the like on a metallic material, a rigid resin material, or the like. More specifically, as illustrated in FIG. 1, the rod guide 9 includes a large-diameter portion 9A and a small-diameter portion 9B. The large-diameter portion 9A is located on an upper side, and is fittedly inserted in an inner circumferential side of the outer cylinder 2. The small-diameter portion 9B is located below the large-diameter portion 9A, and is fittedly inserted in an inner circumferential side of the inner cylinder 5. The rod guide 9 includes the large-diameter portion 9A and the small-diameter portion 9B, thereby being formed into the stepped cylindrical shape. A guide portion 10, which axially slidably guides the piston rod 7, is disposed on an inner circumferential side of the small-diameter portion 9B. This guide portion 10 is configured as a slidable cylindrical member formed by, for example, coating an inner circumferential surface of a metallic cylindrical member with fluorine-based resin (tetrafluoroethylene) or the like.

Further, an annular oil reservoir chamber 9C is provided on an upper surface side of the large-diameter portion 9A of the rod guide 9 that faces the cover member 3, The oil reservoir chamber 9C is defined as an annular space surrounding the rod seal 4 and the piston rod 7 from a radially outer side. Then, when the oil (or the gas mixed in this oil) in the rod-side oil chamber C is leaked via, for example, a slight space between the piston rod 7 and the guide portion 10, the oil reservoir chamber 9C provides a space for temporarily storing this leaked oil and the like.

Further, a communication passage 9D, which is in constant communication with the reservoir chamber A defined in the outer cylinder 2, is formed through the large-diameter portion 9A of the rod guide 9. This communication passage 9D guides the oil (including the gas) reserved in the oil reservoir chamber 9C to the reservoir chamber A defined in the outer cylinder 2. A check valve (not illustrated) is disposed between the cover member 3 and the rod guide 9. More specifically, when the leaked oil increases and overflows in the oil reservoir chamber 9C, the check valve disposed between the cover member 3 and the rod guide 9 permits this overflowing oil to be transmitted toward the communication passage 9D of the rod guide 9 (the reservoir chamber A), while prohibiting the oil from being reversely transmitted from the reservoir chamber A toward the oil reservoir chamber 9C.

Next, the hydraulic stopper mechanism 11 employed in the present embodiment will be described in detail. When the piston rod 7 slides out of the outer cylinder 2 and the inner cylinder 5 (extends or compresses) to reach an end (an extension completion position) in the inner cylinder 5, the stopper mechanism 11 functions in a manner that will be described below, thereby stopping the extension operation of the piston rod 7 with the aid of a hydraulic cushion function to carry out so-called, prevention of complete extension.

The stopper mechanism 11 includes a second cylinder 12, the second piston 13, and a piston ring 17. The second cylinder 12 is located closer to a protruding end side of the piston rod 7 that is the end of the inner cylinder 5, and is disposed inside the enlarged-diameter portion 5A. The second piston 13 is located closer to the rod side 9 than the first piston 6 is to the rod guide 9, and is disposed on the outer circumferential side of the piston rod 7. This stopper mechanism 11 is configured in such a manner that the second piston 13 and the piston ring 17 are slidably fittedly inserted (introduced) into an inner circumferential side of the second cylinder 12 when the piston 7 extends maximally (when the piston 7 extends completely).

The second cylinder 12 includes a collar 12C that will be described below, and a sleeve 12A disposed in the enlarged-diameter portion 5A of the inner cylinder 5 via the collar 12 so as to be prevented from being detached off. The second cylinder 12 is fixedly disposed inside the inner cylinder 5 so as to be positioned coaxially with the inner cylinder 5 (the first cylinder), and is separately formed from the inner cylinder 5 or prepared as a different individual member from the inner cylinder 5. More specifically, an upper end side of the sleeve 12A is fixed by being fitted between a lower end side of the small-diameter portion 9B of the rod guide 9 and the enlarged-diameter portion 5A of the inner cylinder 5 via the cylindrical collar 12C. A lower end side of the sleeve 12A has an opening end 12B flaring with its diameter gradually increasing. This opening end 12B facilitates and ensures that the second piston 13 moving together with the piston rod 7 is slidably fittedly inserted into the sleeve 12A.

The second piston 13 is disposed between the first piston 6 and the second cylinder 12, and constitutes a movable portion of the stopper mechanism 11. More specifically, she second piston 13 is disposed so as to be able to move (be displaced) integrally with the piston rod 7 in the inner cylinder 5 according to a movement of the piston rod 7 to be fittedly inserted into the second cylinder 12. The second piston 13 is made of an annular member using a metallic material, and is fitted in the annular groove 7A on the outer circumferential side of the piston rod 7 so as to be prevented from being detached off. An upper end surface of the second piston 13 is in abutment with a lower end surface of a cushion member 18 that will be described below. Further, a circumferential groove 14 U-shaped in cross-section is formed on an outer circumference (an outer surface) of the second piston 13.

The circumferential groove 14 includes a bottom surface 14A circular in cross-section, a one-side end surface 14B, and an opposite-side end surface 14C. The bottom surface 14A is a circumferentially extending outer circumferential surface that faces an inner circumferential surface of the piston ring 17 that will be described below. The one-side end surface 14B is located on one axial side (an upper side) of the bottom surface 14A, and an upper end surface of the piston ring 17 can abut against the one-end surface 14B. The opposite-side end surface 14C is located on an opposite axial side (a lower side) of the bottom surface 14A so as to be positioned axially (vertically) oppositely from the one-side end surface 14B, and a lower end surface of the piston ring 17 can abut against the opposite-side end surface 14C. The piston ring 17 is detachably attached in the circumferential groove 14. The piston ring 17 has an annular shape with a part thereof cut off, thereby having two ends in a circumferential direction.

Figure 4:
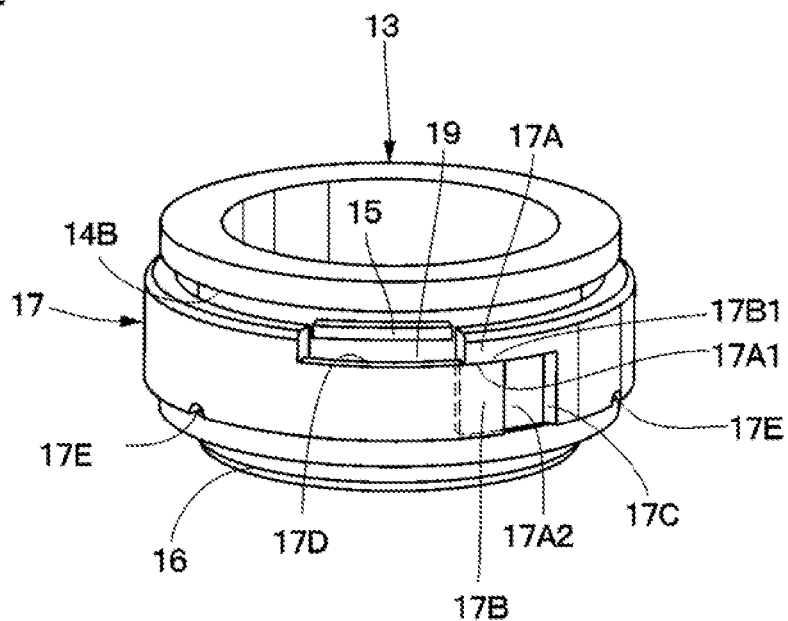
FIG. 4 is a perspective view of a second piston and a piston ring illustrated in FIG. 1, which illustrates them alone.
Figure 5:
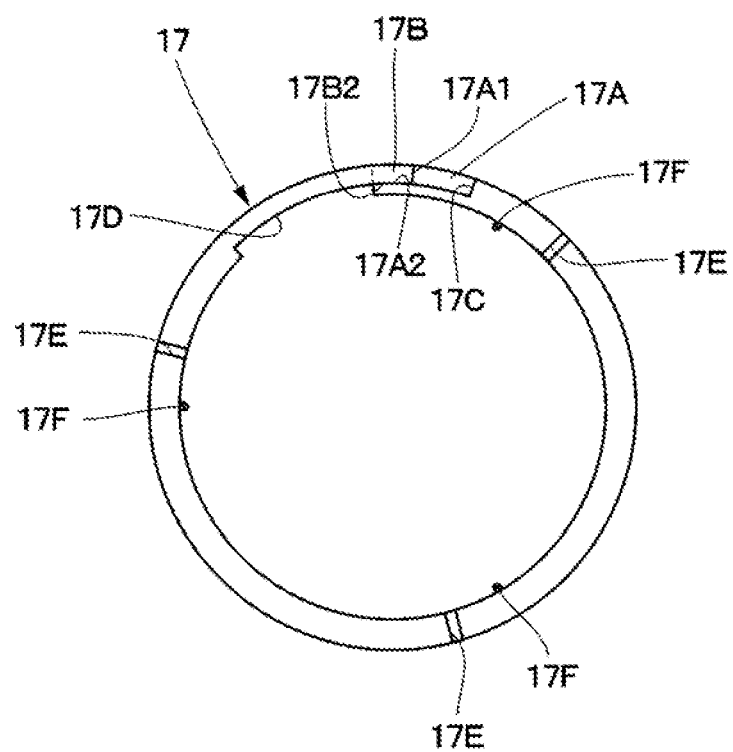
FIG. 5 is a bottom view of the piston ring illustrated in FIG. 4.

Further, a cuboid-shaped engagement protrusion 15 is formed on the bottom surface 14A of the circumferential groove 14 (refer to FIG. 4). The engagement protrusion 15 is engaged with a cutout portion 17D of the piston ring 17 that will be described below. This engagement protrusion 13 is formed at a position axially spaced apart from the one-side end surface 14B, and protrudes radially outwardly from the bottom surface 14A. Then, when the piston ring 17 is attached in the circumferential groove 14 of the second piston 13, the engagement protrusion 15 is engaged with the cutout portion 17D of the piston ring 17, thereby aiding in correct positioning of the piston ring 17 with respect to the second piston 13 and preventing the piston ring 17 from being erroneously attached to the second piston 13. Further, the engagement protrusion 15 of the second piston 13 also functions as a rotation prevention protrusion for preventing the piston ring 17 from being displaced to an incorrect position in a circumferential direction of the circumferential groove 14.

The fitted portion 16 is provided at a lower end located on an opposite axial side (an end closer to the first piston 6) of the second piston 13. The fitted portion 16 is fixed by being fitted in the annular groove 7A of the piston rod 7. This fitted portion 16 has a smaller inner diameter than an inner diameter of the second piston 13 by a predetermined dimension, and is formed integrally with the second piston 13. The fitted portion 16 is fitted in the annular groove 7A so as to be prevented from being detached off with the aid of a metal flow (a plastic flow), thereby playing a role of fixing the second piston 13 to the piston rod 7.

The piston ring 17 is axially movably disposed in the circumferential groove 14 of the second piston 13. The piston ring 17 constitutes the movable portion of the stopper mechanism 11 together with the second piston 13. This piston ring 17 is formed as a ring with use of an elastic material (for example, fluorine-based resin). The piston ring 17 is configured to be expandable and contractable with an increase and a reduction in diameter, with use of a C-shaped ring in which, for example, a certain portion (a single portion) in the circumferential direction is cut off. Therefore, when the piston ring 17 enters the sleeve 12A together with the second piston 13, an outer circumferential surface of the piston ring 17 slidably contacts an inner circumferential surface of the sleeve 12A. As a result, the outer circumferential surface of the piston ring 17 can seal between the sleeve 12A and the second piston 13, thereby limiting a flow of the oil.

The piston ring 17 is detachable attached in the circumferential groove 14 of the second piston 13, and is loosely fitted with respect to the circumferential groove 14 in this state. The piston ring 17 is formed in such a manner that a dimension of an outer diameter thereof is smaller than an inner diameter of she inner cylinder 5 and is slightly larger than an inner diameter of the sleeve 12A, when the piston 17 is in a free length state (a free state without an external force applied thereto). Further, chamfering processing is performed on a corner side of the upper end surface located on one axial side of the piston ring 17 to prevent the piston ring 17 from inflicting a damage, generating a scratch, and the like when entering the sleeve 12A.

Joint portions 17A and 17B having complementary shapes are formed on the ends of the piston ring 17 in the circumferential direction. A recessed groove 17C is formed on the joint portion 17A, which is one of the joint portions. The recessed groove 17C is located in such a manner that the joint portion 17B, which is the other of the joint portions, overlaps the recessed groove 17C. The cutout portion 17D is formed on the other joint portion 17B. The cutout portion 17D is formed by cutting oat one axial side of the joint portion 17B in an L-shaped manner. The other joint portion 17B has a smaller axial dimension than the one joint portion 17A due to the formation of the cutout portion 17D, by which a distal end side of the joint portion 17B is positioned so as to overlap the recessed groove 17C of the joint portion 17A. In this case, when the piston ring 17 is contracted with a reduction in diameter, the other joint portion 17B is slidably displaced along the recessed groove 17C of the one joint portion 17A. Therefore, the other joint portion 17B is formed in such a manner that a thickness thereof (a thickness dimension in a radial direction) is almost equal to a groove depth of the recessed groove 17C.

Axial abutment portions 17A1 and 17B1, and radial abutment portions 17A2 and 17B2 are formed on the joint portions 17A and 17B so that the joint portions 17A and 17B can overlap each other. The axial abutment portions 17A1 and 17B1 can abut against each other in an axial direction of the piston ring 17 (i.e., an axial direction of the circumferential groove 14). The radial abutment portions 17A2 and 17B2 can abut against each other in a radial direction of the piston ring 17 (the circumferential groove 14). A wall surface of the recessed groove 17C, which is located on one axial side thereof, forms the axial abutment portion 17A1, and a bottom surface of the recessed groove 17C forms the radial abutment portion 17A2. Further, the cutout portion 17D forms the axial abutment portion 17B1 on the distal end side of the joint portion 17B.

When the piston ring 17 reaches the position of the second cylinder 12 in the inner cylinder 5 and the outer circumferential surface of the piston ring 17 slides on the inner circumferential surface of the sleeve 12A, the piston ring 17 is elastically contracted with a reduction in diameter according thereto. As a result, the axial abutment portions 17A1 and 17B1 of the piston ring 17 axially abut against each other, and the radial abutment portions 17A2 and 17B2 radially abut against each other.

Figure 3:
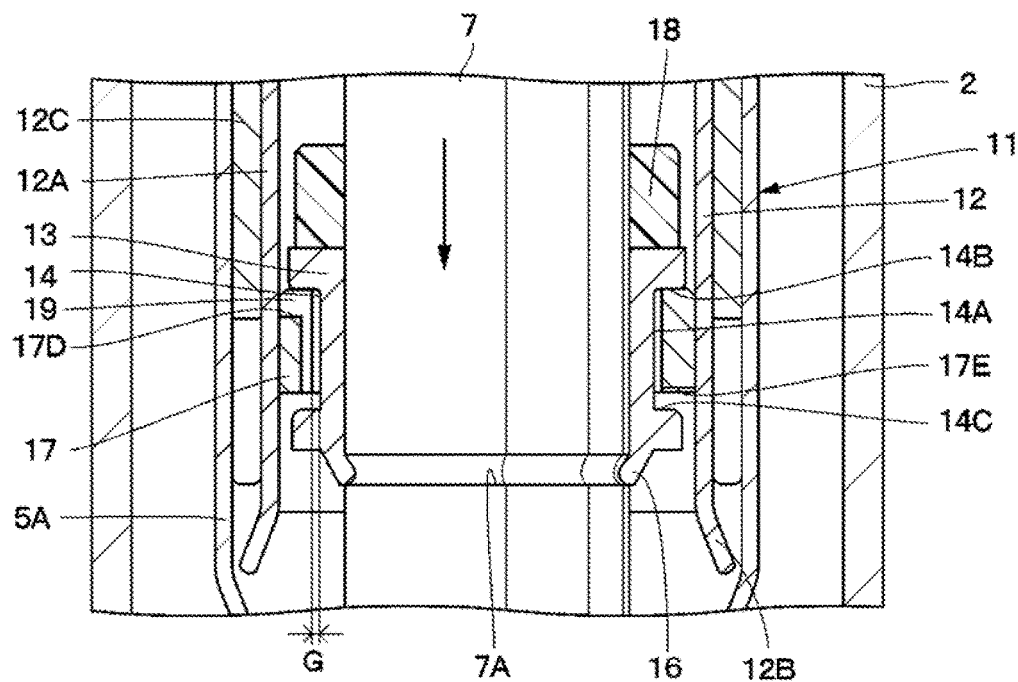
FIG. 3 is an enlarged cross-sectional view of the stopper mechanism during a compression stroke of the piston rod.

The cutout portion 17D formed on the other joint portion 17B of the piston ring 17 forms a first passage 19 between the two joint portions 17A and 17B on the one axial side (the upper end surface side) of the piston ring 17. Even when the upper end surface of the piston ring 17 is in abutment with the one-side end surface 14B of the circumferential groove 14, this first passage 19 permits the oil to flow through between the circumferential groove 14 of the second piston 13 and the end surface (the inner circumferential surface) of the piston ring 17. As illustrated in FIG. 3, even when the piston rod 7 is contracted, a space G is generated between the piston ring 17 and the second piston 13 due to small protrusions 17F that will be described below. The first passage 19 forms an oil passage that permits the oil to flow between the one axial side of the piston ring 17 and the opposite axial side of the piston ring 17 together with the space G, even when the piston rod 7 is contracted.

Orifices 17E, which serve as a second passage, are formed at a lower end of the piston ring 17 that is located on the opposite axial side of the piston ring 17. Each of the orifices 17E is formed as a radially extending groove arcuate in cross-section that establishes communication between the inner circumferential surface and the outer circumferential surface of the piston ring 17. Three orifices 17E (a plurality of orifices 17E) are formed at even intervals in the circumferential direction of the piston ring 17, and constitute a part of the second passage that will be described below, in this case, preferably, each of the orifices 17E is formed at a position spaced apart from the cutout portion 17D in the circumferential direction of the piston ring 17. Each of the orifices 17E establishes constant communication between one axial side and an opposite axial side of the stopper mechanism 11, and forms an oil passage that permits the oil to flow together with the space G generated between the piston ring 17 and the second piston 13 due to the small protrusions 17F during extension of the piston rod 7. Then, when the piston rod 7 extends largely with the second piston 13 entering the second cylinder 12 so as to be fittedly inserted in the second cylinder 12 together with the piston ring 17, the pressure of the oil (a contained pressure) largely increases in the second cylinder 12, and the high-pressure oil is delivered toward the first piston 6 via each of the orifices 17. A force in a direction for stopping the extension operation of the piston rod 7 can be generated by a resistance of the flow through each of the orifices 17E at this time (an effect from restriction of the oil) as a force for reducing an impact when the piston rod 7 extends maximally.

A plurality of small protrusions 17F (hereinafter referred to as the small protrusions 17F) arcuate in cross-section is formed on the inner circumferential surface of the piston ring 17. Each of the small protrusions 17F protrudes from the inner circumferential surface of the piston ring 17 radially inwardly. Further, each of the small protrusions 17F is formed as an elongated protrusion extending in an axial direction of the piston ring 17, and three small protrusions 17F are formed at even intervals in the circumferential direction. These small protrusions 17F form the space G (refer to FIGS. 2 and 3) between the bottom surface 14A of the second piston 13 and the piston ring 17. In this case, preferably, each of the small protrusions 17F is formed at a position spaced apart from the cutout portion 17D in the circumferential of the piston ring 17.

The cushion member 18 is a buffer member fox collision prevention, and is disposed on the outer circumferential side of the piston rod 7 with the piston rod 7 inserted therethrough. The cushion member 18 serves as a stopper for reducing the degree of a collision with the rod guide 9. The cushion member 18 is formed as a cylindrical member generally rectangular in cross-section with use of an elastically deferrable resin or rubber material (for example, a softer elastic material than the piston ring 17). Further, the lower end surface of the cushion member 18 is in abutment with the upper end surface of the second piston 13. Therefore, even when the second piston 13 hits the rod guide 9 at the time of maximum, extension of the piston rod 7, the cushion member 18 reduces an impact at this time, and prohibits the piston rod 7 from further extending. The cushion member 18 constitutes the movable portion of the stopper mechanism 11 together with the second piston 13 and the piston ring 17.

The hydraulic shock absorber 1 as the cylinder apparatus according to the first embodiment is configured in the above-described manner. Next, how to assemble this hydraulic shock absorber 1 will be described.

When the second piston 13, which constitutes the movable portion of the hydraulic stopper mechanism 11, is attached to the piston rod 7, a process for fixing one second piston 13 is performed before the first piston 6 is attached to the piston rod 7. More specifically, the piston rod 7 is inserted in the second piston 13 from the lower end side of the piston rod 7 where the first piston 6 will be attached, and the second piston 13 is moved along the outer circumferential surface of the piston rod 7. Then, the fitted portion 16 is fitted in the annular groove 7A with use of, for example, a fixation method such as the metal flow. As a result, the second piston 13 is fixed to the piston rod 7.

Next, the piston rod 7 is inserted in the piston ring 17 from the end of the piston rod 7 where the rod guide 9 will be attached, and the piston ring 17 is moved along the outer circumferential surface of the piston rod 7 until the piston ring 17 is fitted in the circumferential groove 14 of the second piston 13. At this time, since the dimension of the inner diameter of the piston ring 17 in the free length state is slightly larger than the outer circumferential surface of the bottom surface 14A of the circumferential groove 14, the piston ring 17 can be axially moved in the circumferential groove 14. Further, the cutout portion 17D of the piston ring 17 is engaged with the engagement protrusion 15 of the second piston 13. This can prevent the piston ring 17 from being erroneously mounted upside down, and from being placed at an incorrect position.

After that, the piston rod 7 is inserted in the cushion member 18, and the cushion member 18 is moved so as to be fitted on the outer circumferential side of the piston rod 7 from above the second piston 13 with the lower end surface of the cushion member 18 in abutment with the upper end surface of the second piston 13.

On the other hand, the second cylinder 12 of the stopper mechanism 11 is attached by fitting the sleeve 12A inside the enlarged-diameter portion 5A of the inner cylinder 5 via the cylindrical collar 12C. In this state, the piston rod 7 is inserted inside the inner cylinder 5 to be disposed therein. At this time, the first piston 6 is slidably fittedly inserted in the inner cylinder 5.

After that, the large-diameter portion 9A and the small-diameter portion 9B of the rod guide 9 are press-fitted in the outer cylinder 2 and the inner cylinder 5, respectively. After that, the cover member 3 with the rod seal 4 and the like attached thereto is placed above the rod guide 9. Next, the rod guide 9 is pressed against the inner cylinder 5 via the cover member 3 with use of, for example, a cylindrical pressing tool (not illustrated) so as to prevent the rod guide 9 from axially rattling. The upper end portion of the outer cylinder 2 is bent radially inwardly in this state, by which the radially outer side of the cover member 3 and the large-diameter portion 9A of the rod guide 9 are fixed by the swaged portion 2A.

Next, the hydraulic shock absorber 1 assembled in this manner is mounted on the vehicle in such a manner that the upper end side of the piston rod 7 is attached to a vehicle body side (not illustrated) of the vehicle and the lower end side of the outer cylinder 2 is attached to an axle side (not illustrated) of the vehicle. As a result, when a vibration occurs while the vehicle is running, the piston rod 7 axially compresses and extends into and our of the inner cylinder 5 and the outer cylinder 2 to generate a compression-side damping force and an extension-side damping force with the aid of the disk valves 6C an 6D of the first piston 6 and the like, thereby succeeding in absorbing the vertical vibration of the vehicle so as to reduce it.

More specifically, the pressure increases in the rod-side oil chamber C during an extension stroke of the piston rod 7, whereby the hydraulic oil in the rod-side oil chamber C is transmitted into the bottom-side oil chamber B via the disk valve 6D, leading to generation of the extension-side damping force. Then, the oil is supplied from the reservoir chamber A into the bottom-side oil chamber B via the bottom valve (not illustrated) by an amount corresponding to a volume of a portion of the piston rod 7 projecting from the inner cylinder 5.

At this time, since the pressure increases in the rod-side oil chamber C, the oil in the rod-side oil chamber C may be leaked into the oil reservoir chamber 9C via, for example, the slight space between the piston rod 7 and the guide portion 10. Further, when the leaked oil increases in the oil reservoir chamber 9C, the leaked oil is gradually returned into the reservoir chamber A by being guided toward the communication passage 9D of the rod guide 9 via the check valve (not illustrated) disposed between the cover member 3 and the rod guide 9. In this case, since a space is generated between the outer circumferential surface of the piston ring 17 and the inner circumferential surface of the inner cylinder 5, the oil is transmitted between the one axial side and the opposite axial side of the stopper mechanism 11 via this space.

On the other hand, the pressure increases in the bottom-side oil chamber B located below the first piston 6 during a compression stroke of the piston rod 7, whereby the hydraulic oil in the bottom-side oil chamber B is transmitted into the rod-side oil chamber C via the dish valve 6C of the first piston 6, leading to generation of the compression-side damping force. Then, the oil is supplied from the bottom-side oil chamber 8 into the reservoir A via the above-described bottom valve by an amount corresponding to a volume of a portion of the piston rod 7 entering the inner cylinder 5, whereby the gas is compressed inside the reservoir chamber A so that the volume of the entry of the piston rod 7 can be compensated for. Also in this case, since the space is generated between the outer circumferential surface of the piston ring 17 and the inner circumferential surface of the inner cylinder 5, the oil is transmitted between the one axial side and the opposite axial side of the stopper mechanism 11 via this space in a similar manner to the above-described oil flow during the extension stroke.

Figure 2:
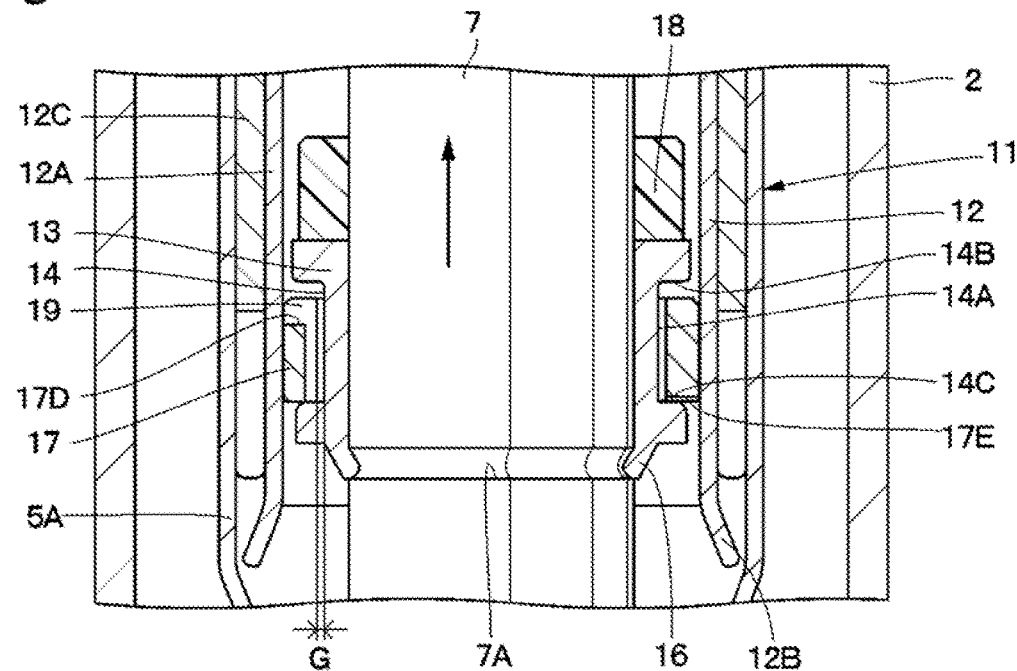
FIG. 2 is an enlarged cross-sectional view of a stopper mechanism during an extension stroke of a piston rod.

When the piston rod 7 extends largely out of the outer cylinder 2, the second piston 13, the piston ring 17, and the cushion member 18, which are the movable portion of the stopper mechanism 11, are slidably fittedly inserted (introduced) la the inner circumferential side of the second cylinder 12. At this time, the outer circumferential surface of the piston ring 17 slidably contacts the inner circumferential surface of the sleeve 12A, and the piston ring 17 is axially relatively displaced in the circumferential groove 14 of the second piston 13. In other words, the lower end surface of the piston, ring 17 abuts against the opposite-side end surface 14C of the circumferential groove 14, as illustrated in FIG. 2.

Further, the piston ring 17 is elastically deformed so as to be radially inwardly contracted with a reduction in diameter by the sleeve 12A of the second cylinder 12, whereby the one joint portion 17A and the other joint portion 17B contact each other with the axial abutment portions 17A1 and 17B1 in axial abutment with each other and the radial abutment portions 17A2 and 17B2 in radial abutment with each other.

Further, the small passage (the oil passage) for permitting a flow of the oil is formed between the piston ring 17 and the circumferential groove 14 of the second piston 13 due to the space G generated by the respective small protrusions 17F and the respective orifices 17E, so as to allow the oil in the second cylinder 12 to be discharged from the one axial side toward the opposite axial side of the second piston 13.

Therefore, when the piston rod 7 extends largely with the second piston 13 entering the second cylinder 12 so as to be fittedly inserted in the second cylinder 12 together with the piston ring 17, the force in the direction for stopping the extension operation of the piston ring 17 can be generated due to the above-described resistance from the restriction of the oil that is caused by the respective orifices 17E, as the force for reducing the impact when the piston rod 7 extends maximally. As a result, a hydraulic cushion effect can be provided to the displacement of the piston rod 7 in the extension direction, which can prohibit the piston rod 7 from extending completely.

Further, even when the piston rod 7 extends maximally to a position that causes the cushion member 18 to hit the lower surface of the rod guide 9 inside the second cylinder 12, the cushion member 18 for collision prevention is elastically deformed at this time, thereby succeeding in reducing the impact and stopping a further extension operation of the piston rod 7.

On the other hand, when the piston rod 7, which has extended maximally in this manner, is switched to the compression stroke (when the second piston 13 is displaced in a direction for exiting from the second piston 12 downwardly), the piston ring 17 slidably contacts the sleeve 12A of the second cylinder 12, whereby the piston ring 17 operates so as to be relatively upwardly displaced. More specifically, the upper end surface of the piston ring 17 abuts against the one-side end surface 14B of the circumferential groove 14, as illustrated in FIG. 3.

However, in this case, the first passage 19 is formed between the cutout portion 17D of the piston ring 17 and the one-side end surface 14B of the circumferential groove 14 at the position between the joint portions 17A and 17B of the piston ring 17. Further, the radially extending space G is formed between the circumferential groove 14 of the second piston 13 and the piston ring 17 due to the plurality of small protrusions 17F. Therefore, during the compression stroke of the piston ring 17, this space G and the first passage 19 can permit the oil to smoothly flow from the opposite axial side to the one axial side of the second piston 13 toward the second cylinder 12, which can facilitate the compression operation of the piston rod 7.

Especially, the first passage 19 is formed so as to have a larger flow passage area than a total flow passage area of all of the orifices 17E, and this means that the oil flows through a larger flow passage area during compression of the piston ring 17 than during extension of the piston ring 17. As a result, the second piston 13, the piston ring 17, and the cushion member 18 operate so as to exit from the inside of the second piston 12 downwardly smoothly, which can ensure that the piston ring 17 compresses smoothly.

In this manner, according to the first embodiment, the hydraulic stopper mechanism 11 includes the second cylinder 12 disposed inside the enlarged-diameter portion 5A of the inner cylinder 5, and the second piston 13, the piston ring 17, and the cushion member 18 disposed on the outer circumferential side of the piston rod 7. The piston ring 17 is formed so as to be expandable and contractable with an increase and a reduction in diameter with use of the C-shaped ring, and the joint portions 17A and 17B having the complementary shapes are formed at the both ends of the piston ring 17 in the circumferential direction of the piston ring 17.

Then, the axial abutment portions 17A1 and 17B1 abuttable against each other in the axial direction of the piston ring 17, and the radial abutment portions 17A2 an 17B2 abuttable against each other in the radial direction of the piston ring 17 are formed between the joint portions 17A and 17B. Therefore, when the piston rod 7 approaches the maximum extension position, the axial abutment portions 17A1 and 17B2 abut against each other, and the radial abutment portions 17A2 and 17B2 abut against each other. This abutment blocks the flow of the oil between the axial abutment portions 17A1 and 17B1 and between the radial abutment portions 17A2 and 17B2, thereby succeeding in stopping the extension operation of the piston rod 7.

Further, the orifices 17E are formed at the piston ring 17 as the second passage so as to generate a damping force when the piston rod 7 extends largely. As a result, the force for reducing the impact can be generated by the respective orifices 17E when the piston rod 7 extends maximally.

On the other hand, during the compression stroke of the piston rod 7, the first passage 19 formed between the cutout portion 17D of the piston ring 17 and the one-side end surface 14B of the circumferential groove 14 permits the oil to smoothly flow from the opposite axial side to the one axial side of the second piston 13 toward the second cylinder 12, which can facilitate the compression operation of the piston rod 7.

Therefore, according to the first embodiment, the hydraulic stopper mechanism 11 can be realized by the second cylinder 12 disposed inside the enlarged-diameter portion 5A of the inner cylinder 5, and the second piston 13 and the piston ring 17 disposed on the outer circumferential side of the piston rod 7. Therefore, the first embodiment can reduce the impact when the piston rod extends completely with a smaller number of parts than the conventional hydraulic shock absorber.

Further, the movable portion of the stopper mechanism 11 is realized by the second piston 13, the piston ring 17, and the cushion member 18. In this case, the movable portion is realized by a small number of parts, which contributes to a reduction in a time required for assembling and thus a reduction in a cost of the assembling process.

Further, the piston ring 17 is made from fluorine-based resin that is an elastically deferrable material. This can improve the assemblability compared to use of a metallic piston ring, and can also achieve a reduction in the weight of the entire hydraulic shock absorber. As a result, the impact can be reduced when the piston rod extends completely.

Figure 6:
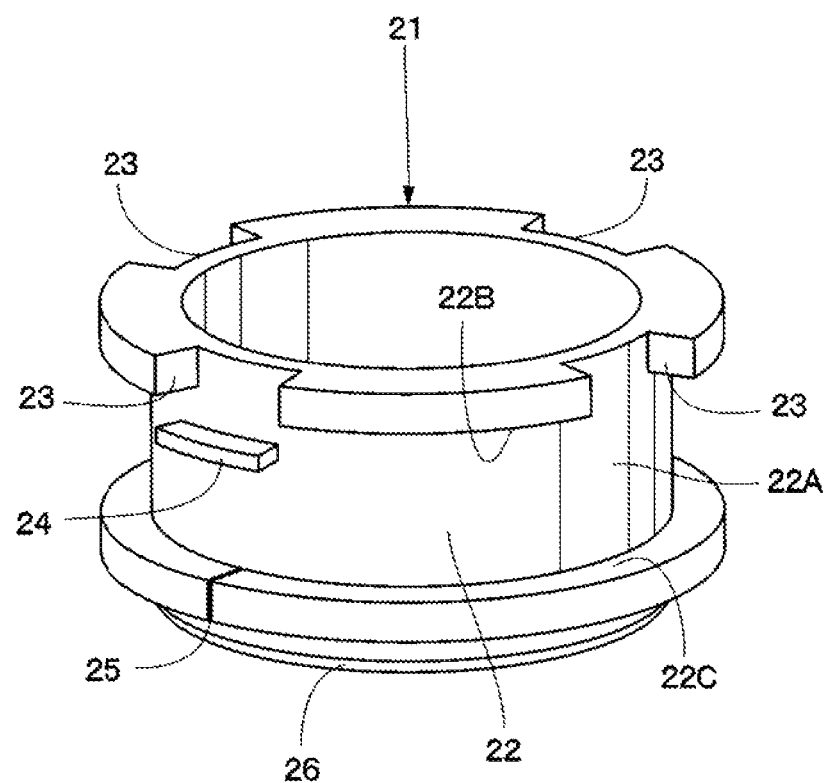
FIG. 6 is a perspective view of a second piston according to a second embodiment, which illustrates in alone.

Next, FIG. 6 illustrates a second embodiment of the present invention. The second embodiment is characterized in that the first passage and the second passage are provided at the second piston. In the following description of the second embodiment, similar components in the second embodiment to the components in the above-described first embodiment will be identified by the same reference numerals as the reference numerals used in the above-described first embodiment, and will be not be described particularly.

A second piston 21 is configured generally similarly to the second piston 13 described in the above-described first-embodiment, and a circumferential groove 22 similar to the first embodiment is formed on an outer circumferential, (an outer surface) of the second piston 21. The circumferential groove 22 includes a bottom surface 22A as an outer circumferential surface, a one-side end surface 22B, and an opposite-side end surface 22C.

However, a plurality of first passages 23 (for example, four first, passages 23) is formed at the second piston 21 as circumferential cutout grooves so as to partially cut out the one-side end surface 22B of the circumferential groove 22. Each of the first passages 23 is a passage that permits the oil to flow in an axial direction of the circumferential groove 22 even daring the compression stroke of the piston rod 7. More specifically, the first passage 23 defines an axial cutout between the upper end surface of the second piston 21 and the one-side end surface 22B of the circumferential groove 22, and four first passages 23 are formed at intervals of 90 degrees in a circumferential direction of the second piston 21.

Each of the first passages 23 permits the oil to smoothly flow during compression of the piston rod 7 in a similar manner to the first passage 19 (refer to FIGS. 2 and 3) defined by the cutout portion 17D of the piston ring 17.

An engagement protrusion 24 similar to the first embodiment is formed, axially below the first passage 23. Further, an orifice 25 is formed on the opposite-side end surface 220, of the circumferential groove 22 to allow the oil to flow therethrough. The orifice 25 is defined by a groove formed by slightly cut out the surface of the opposite-side end surface 22C of the circumferential groove 22. This orifice 25 constitutes the second passage, and functions to restrict a flow amount of the oil during extension of the piston rod 7, in a similar manner to the orifice 17E described in the above-described first embodiment. Further, a fitted portion 26 similar to the fitted portion 16 described in the first embodiment is provided at a lower end of the second piston 21.

In this manner, the second embodiment can also acquire substantially similar effects to the first embodiment. According to the second embodiment, the four first passages 23 are formed at an upper end (the one-side end surface 22B) of the second piston 21 to permit the oil to flow therethrough. Therefore, the oil can flow through a larger flow passage area during compression of the piston rod 7. As a result, the second piston 21, the piston ring 17, and the cushion member 18 operates so as to exit smoothly downwardly from inside the second cylinder 12, thereby succeeding in ensuing that the piston rod 7 compresses smoothly.

The above-described respective embodiments have been described based on the example in which the piston ring 17 is formed as the ring expandable and contractable with an increase and a reduction in diameter with use of, for example, fluorine-based resin. However, the present invention is not limited thereto. For example, the piston ring may be formed with use of a rubber elastic material such as synthetic rubber and natural rubber.

Further, in the above-described respective embodiments, the piston ring 17 is configured in such a manner that the small protrusions 17F are formed on the inner circumferential surface of the piston ring 17 to define or generate the space G between the bottom surface 14A of the second piston 13 and the inner circumferential surface of the piston ring 17. However, the present invention is not limited thereto. For example, the second piston may be configured in such a manner that a protrusion is formed on the bottom surface of the circumferential groove of the second piston to define or generate, for example, the space G as described above.

Further, in the above-described respective embodiments, the hydraulic shock absorber 1 is configured in such a manner that the cylinder, which becomes the second cylinder 12, is fittedly inserted in the inner cylinder 5 (the first cylinder), and the inner cylinder 5 and the second cylinder 12 are prepared as separate individual members. However, the present invention is not limited thereto. For example, the hydraulic shock absorber 1 may be configured in such a manner that the inner cylinder is reduced in diameter, and the inner cylinder and the second cylinder are formed integrally with each other.

Further, in the above-described respective embodiments, the second piston is configured in such a manner that the engagement protrusion 15 or 24 is engaged with the cutout portion 17D of the piston ring 17. However, the present invention is not limited thereto. For example, the engagement protrusion may have a cylindrical shape or the like. In other words, this protrusion only has to be able to prevent the piston ring from being erroneously attached, and does not necessarily have to be shaped so as to be engageable with the cutout portion.

Further, in the above-described respective embodiments, the second piston is configured in such a manner that the engagement protrusion 15 or 24 is formed at the position axially spaced apart from the one-side end surface 14B or 22B of the second piston 13 or 21. However, the present invention is not limited thereto. For example, the engagement protrusion may be formed integrally with the one-side end surface of the second piston.

Further, the first embodiment has been described based on the example in which the second piston 13 is formed as a single piece member while the circumferential groove 14 U-shaped in cross section is formed on the outer circumferential surface (the outer surface) thereof. However, the present invention is not limited thereto. For example, the second piston may be configured to be axially divided into two upper and lower pieces, in particular, divided into two upper and lower pieces at an axial middle position of the circumferential groove. Then, the second piston divided into the two pieces may be configured in such a manner that the second piston is assembled as the single-piece second piston by joining the two divided upper and lower pieces to each other to integrally attach them with the piston ring attached on the outer circumferential side of the circumferential groove. Further, the second piston may be configured in such a manner that an annular disk prepared as a different member is disposed between this second piston and the piston ring, and a plurality of U-shaped cutouts is formed at this disk at intervals in the circumferential direction, thereby defining the first passage by these cutouts. Then, such a modification can be also applied to the second embodiment in a similar manner.

Further, the above-described respective embodiments have been described based on the hydraulic shock absorber 1 to be mounted on each wheel side of the four-wheeled automobile as the representative example of the cylinder apparatus. However, the present invention is not limited thereto. For example, the present invention may be embodied by a hydraulic shock absorber for use in a two-wheeled vehicle, and may be applied to a cylinder apparatus for use in various kinds of machines, buildings, and the like other than the vehicle.

Next, the inventions included in the above-described embodiments will be described. According to the present invention, the second passage, which establishes constant communication between the one side and the opposite side of the stopper mechanism, may be formed on at least one of the piston ring and the second piston. Farther, the stopper mechanism may be configured in such a manner that the first passage and the second passage are formed at the positions facing the both ends of the piston ring.

Further, the stopper mechanism may be configured in such a manner that the plurality of protrusions is formed on at least one of the inner circumferential surface of the piston, ring and the outer circumferential surface of the circumferential groove. Further, the first passage may be defined by the cutout portion formed by cutting out the end surface of the piston ring, and this cutout portion may be engaged with the engagement protrusion provided on the circumferential groove of the second piston.

Further, the second cylinder may be configured to be formed integrally with the first cylinder with the first cylinder reduced in diameter, or may be separately formed from the first cylinder or prepared as a different individual member from the first cylinder. Further, the second piston may be configured in such a manner that the fitted portion fitted in the groove formed on the piston rod is formed integrally with the second piston.

According to the present invention, the impact can be reduced when the piston rod extends maximally with a small number of parts.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2014-39242 filed on Feb. 28, 2014.

The entire disclosure of Japanese Patent Application No. 2014-39242 filed on Feb. 28, 2014 including specification, claims, drawings and summary are incorporated herein by reference in its entirety.

What is claimed is:

1. A cylinder apparatus comprising:
   a first cylinder sealingly containing hydraulic fluid;
   a first piston slidably fitted in the first cylinder and dividing an inside of the first cylinder;
   a piston rod coupled to the first piston;
   a rod guide disposed on an end of the first cylinder and configured to slidably guide the piston rod with the piston rod inserted through the rod guide; and
   a stopper mechanism configured to function when the piston rod extends to reach the end of the first cylinder, wherein the stopper mechanism includes a second cylinder disposed at the end of the first cylinder, and a second piston disposed so as to be able to move according to a movement of the piston rod to be fitted into the second cylinder, wherein the second piston includes a circumferential groove formed on an outer circumference of the second piston, the circumferential groove including a bottom surface, a one-side end surface, and an opposite-side end surface, wherein an annular piston ring is axially movably disposed in the circumferential groove, the piston ring having an end and an opposite end that are displaceable relative to each other, wherein the piston ring includes axial abutment portions axially abuttable against each other, and radial abutment portions radially abuttable against each other, at both ends of the piston ring, wherein the stopper mechanism is configured in such a manner that a first passage is defined between an end surface of the piston ring and the one-side end surface when the piston ring abuts against the one-side end surface that is located at an end of the circumferential groove closer to the end in the first cylinder, and wherein a plurality of protrusions are formed on at least one of an inner circumferential surface of the piston ring and an outer circumferential surface of the circumferential groove.

2. The cylinder apparatus according to claim 1, wherein a second passage is formed on at least one of the piston ring and the second piston, the second passage establishing constant communication between one side and an opposite side of the stopper mechanism.

3. The cylinder apparatus according to claim 1, wherein the first passage includes a cutout portion formed by cutting out an end surface of the piston ring, and the cutout portion is engageable with an engagement protrusion provided on the circumferential groove of the second piston.

4. The cylinder apparatus according to claim 2, wherein the first passage includes a cutout portion formed by cutting out an end surface of the piston ring, and the cutout portion is engageable with an engagement protrusion provided on the circumferential groove of the second piston.

5. The cylinder apparatus according to claim 1, wherein the second cylinder is formed integrally with the first cylinder with the first cylinder reduced in diameter.

6. The cylinder apparatus according to claim 1, wherein the second cylinder is separately formed from the first cylinder.

7. The cylinder apparatus according to claim 1, wherein a fitted portion is integrally formed at the second piston, the fitted portion being configured to be fitted to a groove formed on the piston rod.

8. A cylinder apparatus comprising:
a first cylinder sealingly containing hydraulic fluid;
a first piston slidably fitted in the first cylinder and dividing an inside of the first cylinder;
a piston rod coupled to the first piston;
a rod guide disposed on an end of the first cylinder and configured to slidably guide the piston rod with the piston rod inserted through the rod guide; and
a stopper mechanism configured to function when the piston rod extends to reach the end of the first cylinder, wherein the stopper mechanism includes a second cylinder disposed at the end of the first cylinder, and a second piston disposed so as to be able to move according to a movement of the piston rod to be fitted into the second cylinder, wherein the second piston includes a circumferential groove formed on an outer circumference of the second piston, the circumferential groove including a bottom surface, a one-side end surface, and an opposite-side end surface, wherein an annular piston ring is axially movably disposed in the circumferential groove, the piston ring having an end and an opposite end that are displaceable relative to each other, wherein the piston ring includes axial abutment portions axially abuttable against each other, and radial abutment portions radially abuttable against each other, at both ends of the piston ring, and wherein the stopper mechanism is configured in such a manner that a first passage is defined between an end surface of the piston ring and the one-side end surface when the piston ring abuts against the one-side end surface that is located at an end of the circumferential groove closer to the end in the first cylinder, wherein the first passage includes a cutout portion formed by cutting out an end surface of the piston ring, and the cutout portion is engageable with an engagement protrusion provided on the circumferential groove of the second piston.

9. The cylinder apparatus according to claim 8, wherein a second passage is formed on at least one of the piston ring and the second piston, the second passage establishing constant communication between one side and an opposite side of the stopper mechanism.

10. The cylinder apparatus according to claim 8, wherein a plurality of protrusions are formed on at least one of an inner circumferential surface of the piston ring and an outer circumferential surface of the circumferential groove.

11. The cylinder apparatus according to claim 9, wherein a plurality of protrusions are formed on at least one of an inner circumferential surface of the piston ring and an outer circumferential surface of the circumferential groove.

12. The cylinder apparatus according to claim 8, wherein the second cylinder is formed integrally with the first cylinder with the first cylinder reduced in diameter.

13. The cylinder apparatus according to claim 8, wherein the second cylinder is separately formed from the first cylinder.

14. The cylinder apparatus according to claim 8, wherein a fitted portion is integrally formed at the second piston, the fitted portion being configured to be fitted to a groove formed on the piston rod.

* * * * *